US008750429B2

(12) United States Patent  (10) Patent No.: US 8,750,429 B2
Jones  (45) Date of Patent: Jun. 10, 2014

(54) MULTIPLE PROTOCOL SOFTWARE DEFINED RADIO

(75) Inventor: Mark J. Jones, San Diego, CA (US)

(73) Assignee: Field Intelligence, Inc., San Diego, CA (US)

(*) Notice: Subject to any disclaimer, the term of this patent is extended or adjusted under 35 U.S.C. 154(b) by 481 days.

(21) Appl. No.: 12/804,050

(22) Filed: Jul. 12, 2010

(65) Prior Publication Data

US 2011/0007849 A1  Jan. 13, 2011

Related U.S. Application Data

(60) Provisional application No. 61/224,961, filed on Jul. 13, 2009.

(51) Int. Cl.
*H04L 27/04* (2006.01)
*H03D 1/00* (2006.01)

(52) U.S. Cl.
USPC ............ 375/340; 375/219; 375/295; 375/316

(58) Field of Classification Search
CPC . H04L 1/0003; H04L 1/0071; H04L 27/2647; H04L 1/0045; H04L 25/067; H04B 1/40
USPC .................................. 375/295, 316, 340, 219
See application file for complete search history.

(56) References Cited

U.S. PATENT DOCUMENTS

| 2002/0050952 | A1* | 5/2002 | Takayama et al. | 343/702 |
| 2007/0281626 | A1* | 12/2007 | Dobosz et al. | 455/73 |
| 2008/0304597 | A1* | 12/2008 | Peach | 375/324 |

OTHER PUBLICATIONS

Mark Cummings, Todor Cooklev, *Tutorial: Software Defined Radio Technology* 25th Conference on Computer Design, ICCD 2007, Oct. 7-10, 2007, Lake Tahoe, CA, USA, Proceedings. IEEE 20072 ISBN Jan. 4244-1258-7.

* cited by examiner

*Primary Examiner* — Ted Wang
(74) *Attorney, Agent, or Firm* — Continuum Law; Robert P. Cogan

(57) ABSTRACT

A single software defined radio handles both AIS and ORB-COMM communications. A software defined software defined radio detects incoming signals and resolves whether they are AIS or ORBCOMM signals. The signal is directed to a processor in which an algorithm is selected in correspondence with the type of signal which has been recognized. The algorithm extracts intelligence when receiving or encodes intelligence when transmitting. The present software defined radio switches from the ORBCOMM mode to the AIS mode automatically as required in order to maintain a mandatory duty cycle in both the AIS and ORBCOMM modes as defined by regulations, and provides user configurable communications capabilities over both the AIS and ORBCOMM networks in a low-cost, integrated, hardware implementation.

10 Claims, 6 Drawing Sheets

ORBCOMM 12-BYTE DATA PACKET

MULTIPLE PROTOCOL SOFTWARE DEFINED RADIO

CROSS REFERENCE TO RELATED APPLICATIONS

This application claims priority from U.S. Provisional Patent Application Ser. No. 61/224,961 filed Jul. 13, 2009, the disclosure of which is incorporated herein by reference.

BACKGROUND OF THE INVENTION

1. Field of the Invention

The present subject matter relates to software defined radio, and more particularly to a radio capable of operation with multiple protocols.

2. Background

Two significant forms of radio communication are referred to as AIS and ORBCOMM.

AIS or Automatic Identification System is a short range coastal tracking system used on ships and by Vessel Traffic Services (VTS) for identifying and locating vessels by electronically exchanging identification, position, course, and speed data with other nearby ships and VTS stations. Class A AIS radio is required under an international convention to be fitted aboard international voyaging ships with gross tonnage (GT) of 300 or more tons, and all passenger ships regardless of size. Class A AIS radios are significantly more expensive than other classes of AIS radios and have a robust set of capabilities.

Other classes of AIS radios are Class B and receive (RX) only. These are simpler, and are used in fishing vessels and leisure craft. They have a smaller set of capabilities. A Class B transponder provides both AIS reception and transmission at a fraction of the cost of a conventional class A transponder. The Class B AIS radio requires use of Digital Selective Calling (DSC) channel 70 for channel management. Additionally, a GPS antenna is included. The RX only AIS radio does not include a calling channel.

In order to prevent overloading of available bandwidth, Class B transmissions are restricted to 2 watts. This limits range for vessels using Class B AIS to a range of about 5 to 10 miles. At the present time, almost all Class B units use software defined radio. The transmitted signal is a standard AIS data stream at 9600 bps using Gaussian Minimum Shift Keying (GMSK). Generally, an AIS radio is equipped with a serial interface accepting RS-232 and/or NMEA formats.

ORBCOMM satellites are low Earth orbit communications satellites, operated by the United States satellite communications company Orbcomm, Inc. As of 2008, 44 such satellites were in orbit. The ORBCOMM Satellite Communication System is a wide area, packet switched, two-way data communication system that utilizes constellations of the ORBCOMM satellites and earth station gateways. These satellites relay digitized data in the vicinities of 137 MHz and 150 MHz. A terrestrial ORBCOMM radio communicates with a satellite. A nominal ORBCOMM radio may comprise a single board microprocessor based VHF transceiver capable of transmitting and receiving messages in cooperation with the Orbcomm Satellite Communication System. ORBCOMM customers access the gateway and thus, the satellite, via dial up circuits, the Internet, or X.25 protocol access systems. The ORBCOMM radios transmit between 148.00 and 150.05 MHz at 5 to 10 watts using 2400 bps Symmetric Differential Phase Shift Keying (SDPSK) modulation and receive downlink 4800 bps SDPSK modulated signals between 137.0 and 138.0 MHz. They access the satellite via an ORBCOMM proprietary acquire-communicate TDMA/FDMA protocol.

The AIS and ORBCOMM radios operate on diverse frequencies and use different forms of signal modulation. The data structure for packets in each system is different. If a ship or other communications platform wishes to use both AIS and ORBCOMM communications, the operator must buy separate AIS and ORBCOMM radios.

SUMMARY

The present subject matter provides for a single radio to process both AIS and ORBCOMM communications. Briefly stated, in accordance with the present subject matter, there is provided a software defined radio that detects incoming signals and resolves whether they are AIS or ORBCOMM signals. The signal is directed to a processor in which an algorithm is selected in correspondence with the type of signal which has been recognized. The algorithm extracts intelligence when receiving or encodes intelligence when transmitting. The present radio switches from the ORBCOMM mode to the AIS mode as required in order to maintain a mandatory duty cycle in both the AIS and ORBCOMM modes as defined by regulations.

BRIEF DESCRIPTION OF THE DRAWINGS

The present subject matter may be further understood by reference to the following description taken in connection with the following drawings.

DETAILED DESCRIPTION

In accordance with the present subject matter, a radio is provided which efficiently and cost-effectively combines AIS and ORBCOMM functionality. In order to better understand the present subject matter, prior art AIS and ORBCOMM radios are discussed.

Figure 1:
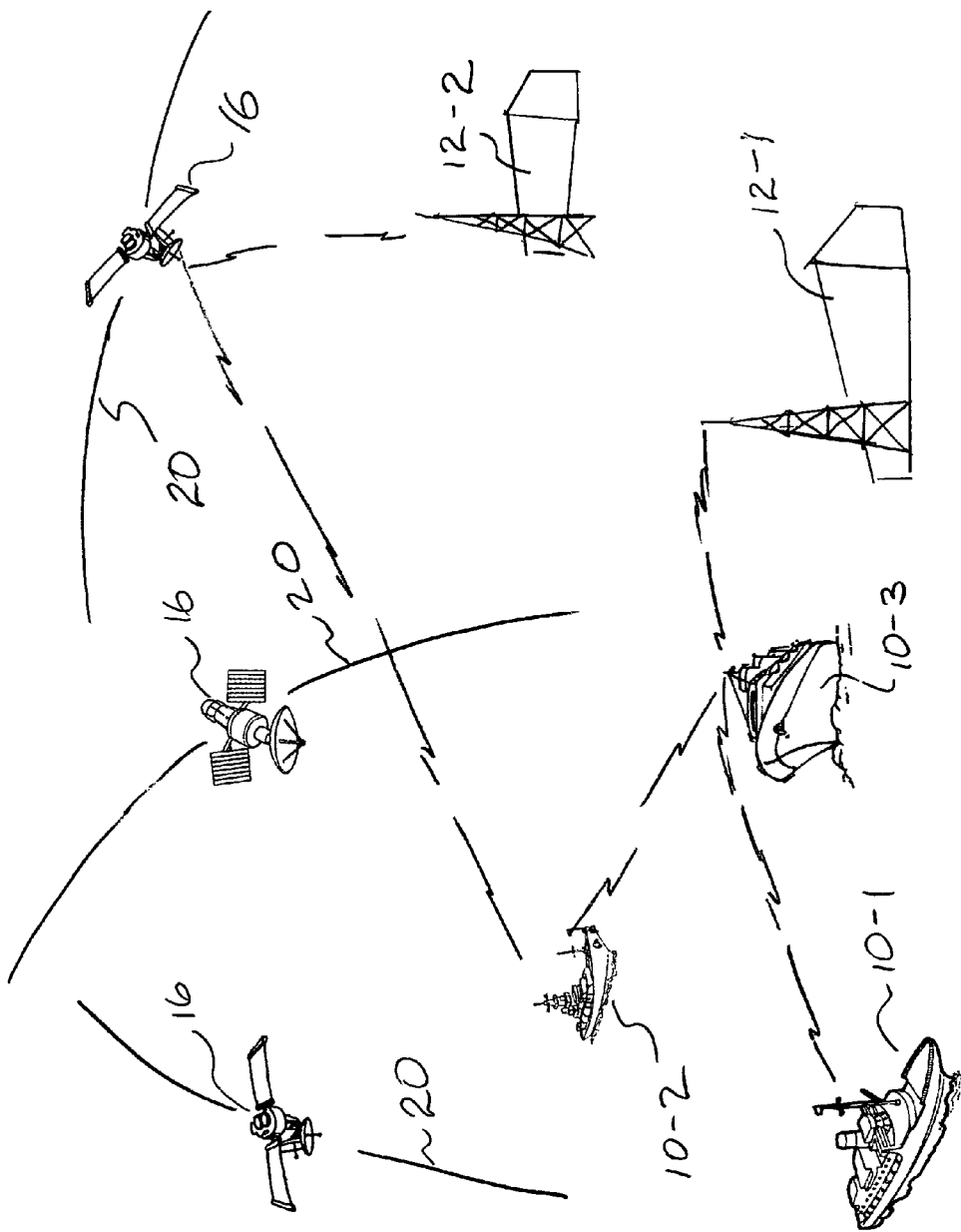
FIG. 1 illustrates employment of AIS and ORBCOMM communications in a maritime context.

FIG. 1 illustrates employment of AIS and ORBCOMM communications in a maritime context. Ships 10, e.g., ships 10-1, 10-2, and 10-3, communicate AIS data. Alternatively, one of the ships 10 may carry a receive only (RX only) AIS radio. AIS data may include a ship's call sign, name, navigation-related information, and location and speed information. Additionally, ships 10 interact with a shore station 12-1.

A ship 10, e.g., ship 10-2, may need to communicate with a remote shore station 12-2 via ORBCOMM radio. The communication is sent via a satellite 16 in a satellite constellation 18. Each satellite 16 is in an orbit 20. This context is but one example of an application of the present subject matter, and does not indicate any limitation on the context in which communications discussed herein may be employed.

Figure 2:
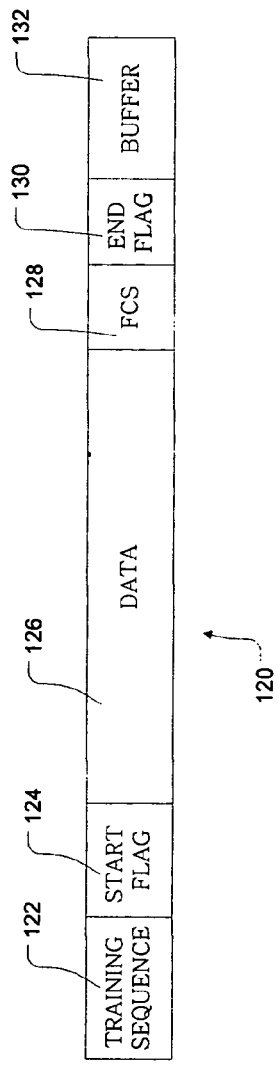
FIG. 2 is a chart illustrating an AIS data packet.

FIG. 2 is a chart illustrating an AIS data packet 120. The data packet 120 comprises a preamble 122, start flag 124, data 126, frame check sequence (FCS) 128, end flag 130, and a buffer 132.

Figure 3:
FIG. 3 consists of FIGS. 3a and 3b, which are charts illustrating an ORBCOMM data packet.

FIG. 3, consisting of FIG. 3a and FIG. 3b, is a chart illustrating an ORBCOMM data packet. FIG. 3a illustrates a downlink packet structure 160 comprising fifty segments 162. The segment 162-0 is a synchronization segment, followed by 49 information segments 162-1 through 162-49. As seen in FIG. 3b, each information segment 162 comprises twelve bytes 166. The bytes are designated 166-0 through 166-12. Byte 166-0 identifies the packet type. Bytes 166-1 through 166-10 are data or payload bytes. Bytes 166-11 and 166-12 provide checksums.

AIS and ORBCOMM radios have distinct protocols, and they operate at different frequencies. If a user of a Class B AIS radio or an RX AIS only radio wants to use both protocols, the user must buy a separate ORBCOMM radio. The present subject matter allows an AIS radio user or an ORBCOMM radio user to have the functionality of both protocols at only an incremental increase in cost or even virtually no increase in cost.

Figure 4:
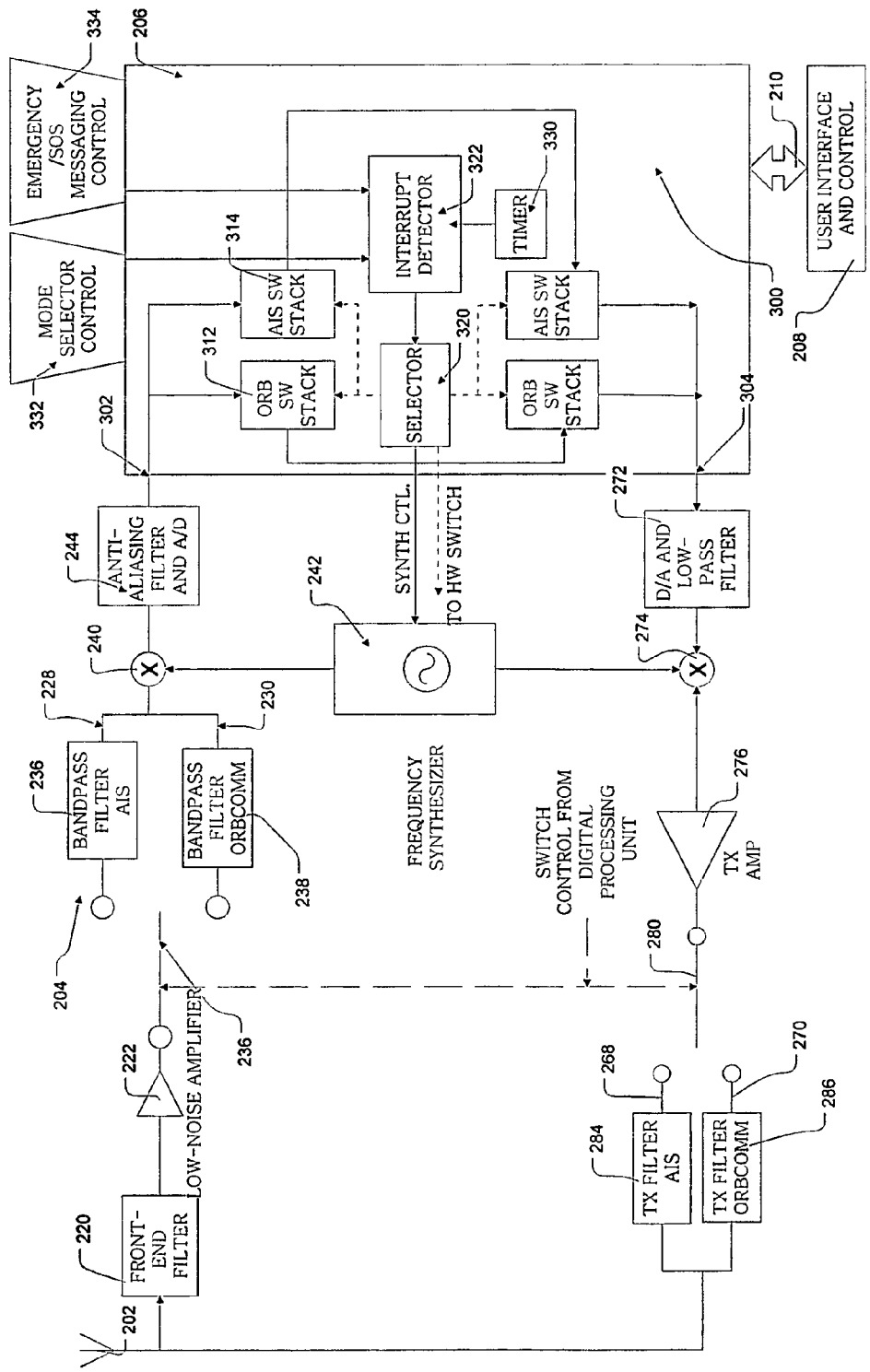
FIG. 4 is a block diagram of an AIS/ORBCOMM radio constructed in accordance with the present subject matter.

FIG. 4 is a block diagram of an AIS/ORBCOMM radio 200 constructed in accordance with the present subject matter. The particular diagram of FIG. 4 represents one form of hardware. The radio 200 receives and transmits signals from an antenna 202. The radio 200 operates in a half duplex mode. In the AIS/ORBCOMM application, transmission periods are short compared to receiving periods. The antenna 202 is coupled to a front end 204. The front end 204 is coupled to a processing section 206. The front end 204 is a section in which incoming signals and outgoing signals are converted to and from baseband frequency at which the processing section 206 operates. The processing section 206 may communicate with a user terminal 208 via a data bus 210. The user terminal 208 may comprise a personal computer or a maritime display console. The user terminal 208 may be a source of command signals.

The received signals may be coupled through a front end filter 220 and a low noise amplifier 222. The front end 204 includes an AIS signal path 228 and an ORBCOMM signal path 230.

The radio is connected to the received signals from the first signal receiving path 228 or the second receiving signal path 230 by switch 236. The AIS and ORBCOMM receiving signal paths 228 and 230 include bandpass filters 236 and 238 respectively. The filters 236 and 238 couple signals to a mixer 240. The mixer 240 receives a second input from a frequency synthesizer 242. The mixer 240 provides an output signal at a preselected frequency to the input of an analog to digital converter (ADC) 244. The ADC 244 provides a digital signal to the processing section 206.

The AIS and ORBCOMM bandpass filters 236 and 238 are selected to have center frequencies each corresponding to the receive frequency associated with the network. In the present illustration, the bandpass filter 236 is associated with AIS frequencies, and the bandpass filter 238 is associated with ORBCOMM frequencies.

For RX only AIS, transmission is done over the ORBCOMM channel only. For generality, both AIS and ORBCOMM transmission is shown in FIG. 4 and described here. Transmission is done over first and second transmission signal paths 268 and 270. A digital to analog converter (DAC) 272 receives a digital output from the processing section 206. A mixer 274 receives inputs from the DAC 272 and the frequency synthesizer 242. The converted frequency is coupled via a transmission amplifier 276 to a switch 280. The switch 280 selectively connects the transmitted signal to the transmission signal path 268 or 270. First and second bandpass filters 284 and 286 are connected in the first and second signal paths 268 and 270 respectively. The bandpass filters 284 and 286 each provide an output signal to the antenna 202 when connected for transmission. The passbands of the filters 284 and 286 are selected to correspond respectively to a frequency utilized for protocol of the signal path. In the present illustration, the bandpass filter 284 is associated with AIS transmission. The bandpass filter 286 is associated with ORBCOMM transmission.

The frequency synthesizer 242 receives a control signal from the digital processor 206. The control signal commands a first or a second state of the first and second switches 236 and 280. The control signal also commands the state of frequency synthesizer 242. Each state of the frequency synthesizer 242 corresponds to the provision of AIS or ORBCOMM frequencies.

The processing section 206 may comprise a digital signal processor (DSP) 300. The DSP 300 has an input terminal 302 and an output terminal 304 coupled to the filters 244 and 272 respectively. In practice, the input terminal 302 may be a set of pins on a digital device rather than a discrete terminal. The DSP 300 also communicates with the user terminal 208 via data bus 210. First and second software stacks comprise an ORBCOMM software stack 312 and an AIS software stack 314. In the present description, a software stack is a set of programs that work together to produce a result. A software stack may include an operating system and its applications, particularly a group of applications that work in sequence toward a common result or any set of utilities that work as a group. In the present embodiment, the software stacks comprise software defined radio processors.

Software defined radio routines are known. See, for example, Mark Cummings, Todor Cooklev, *Tutorial: Software Defined Radio Technology* 25th International Conference on Computer Design, ICCD 2007, 7-10 Oct. 2007, Lake Tahoe, Calif., USA, Proceedings. IEEE 2007, ISBN 1-4244-1258-7. These software stacks provide their outputs to the output terminal 304. The selection of software stacks and is made by a selector 320. In order to command a mode or modes, the selector 320 responds to an interrupt detector 322.

A number of different means for providing a command input to the interrupt detector 322 may be provided. A timer 330 may be connected to provide a periodic control signal in order to assure that the AIS mode is commanded for at least the duration of time periods required by regulations. The interrupt detector 322 is also responsibly coupled to a mode selector control 332 and an emergency communication and distress signal control 334. The mode selector control 332 may be commanded from the user interface 208.

Figure 5:
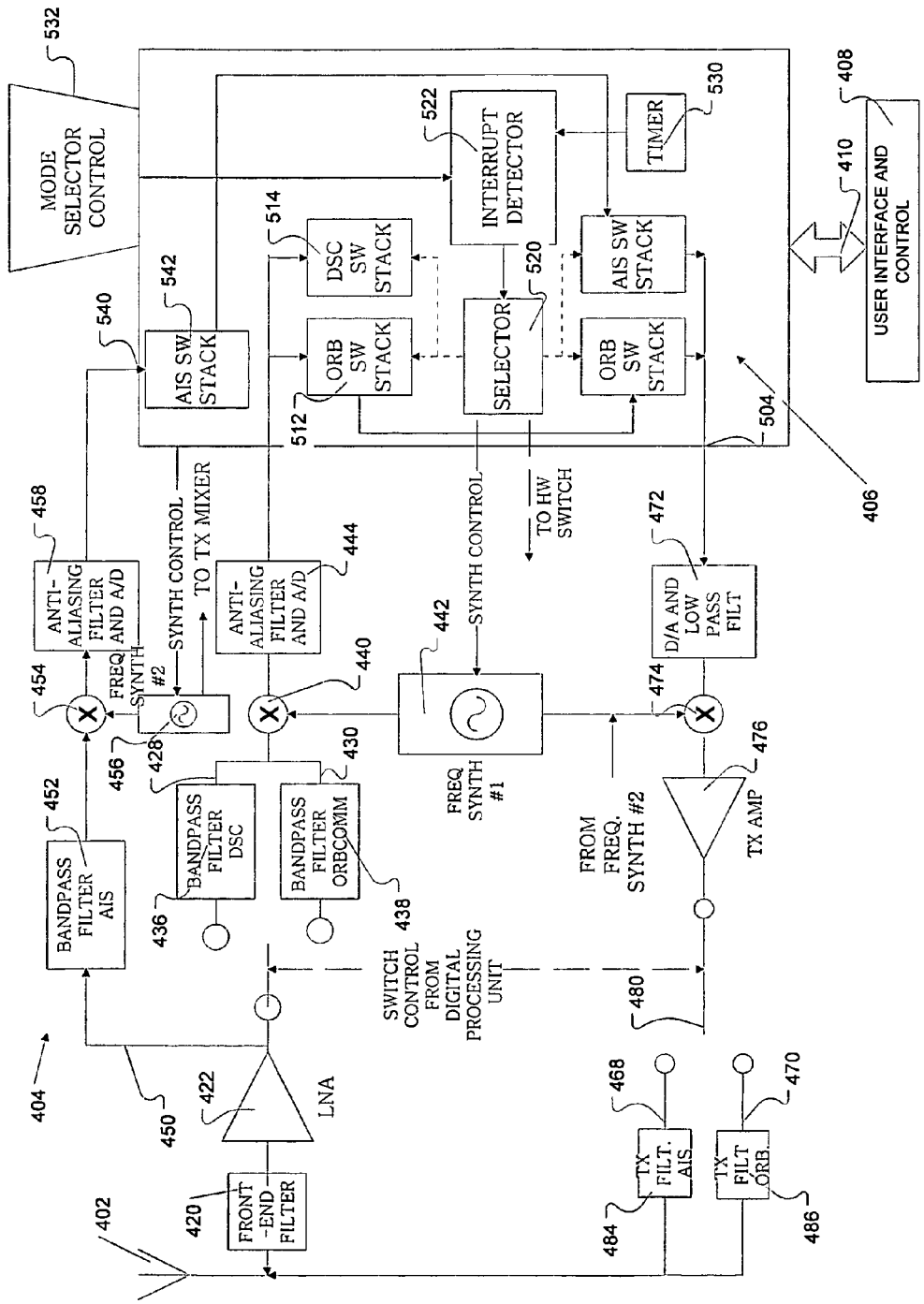
FIG. 5 is a block diagram of an AIS Class B/ORBCOMM radio constructed in accordance with the present subject matter.

FIG. 5 is a block diagram of an AIS Class B/ORBCOMM radio constructed in accordance with the present subject matter. In FIG. 5, components corresponding to those of FIG. 4 are provided, but an additional channel for DSC is required for emergency communications and channel management. In the hardware implementation form shown in FIG. 5, ORBCOMM and DSC will share a common digitized receive channel, and the AIS channel reception will occur via a separate baseband channel. In FIG. 5, components corresponding to those of FIG. 4 are provided. Receive components 402 through 444 of FIG. 5 correspond to components 202 through 244 of FIG. 4 respectively. They operate similarly, with the exception that the shared receive channel contains ORBCOMM and DSC vice ORBCOMM and AIS. Components 500 through 532 correspond to components 300 through 332 respectively. They also operate similarly, with the exception that the DSC software stack replaces the AIS software stack. The AIS receiver is accommodated by separate receive signal path 450, an AIS bandpass filter 452, a mixer 454, synthesizer 456, an analog to digital converter 458, an input terminal 540, and an AIS software stack 542. Transmit components 268 through 286 correspond to components 468 through 486. They operate similarly.

Figure 6:
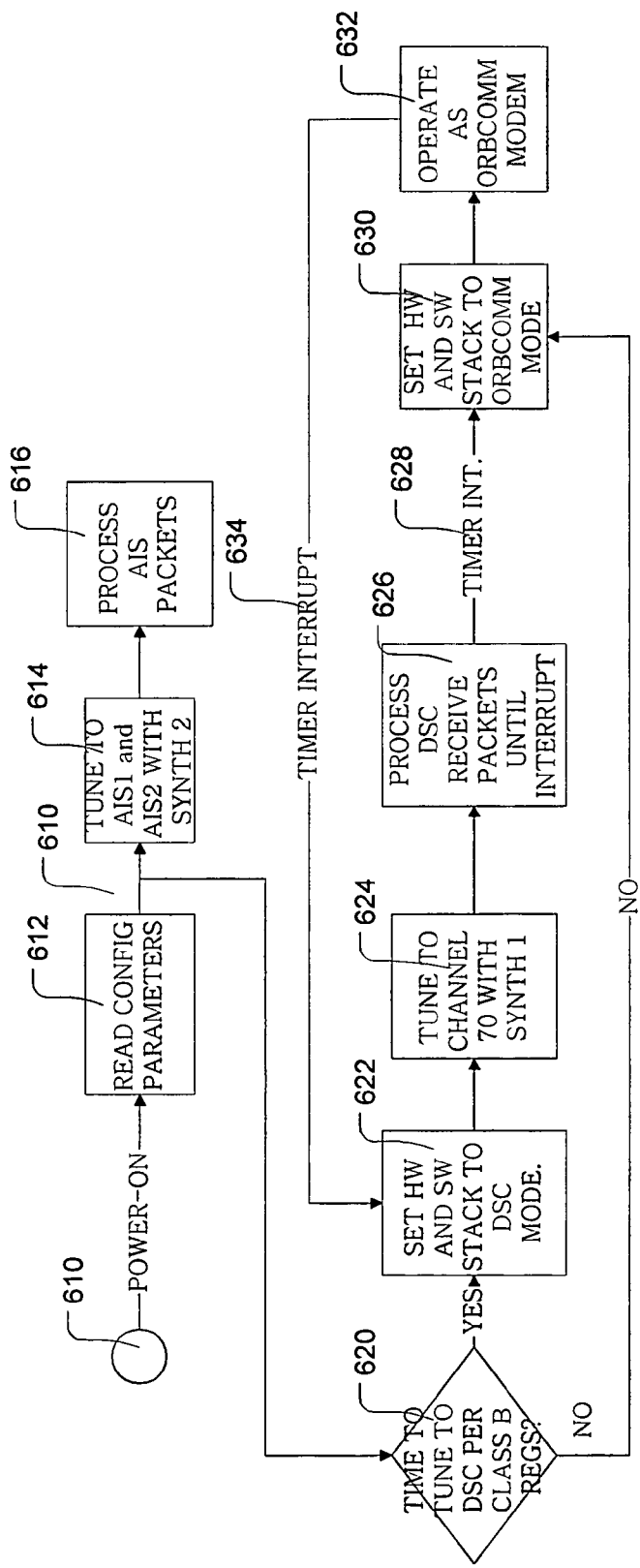
FIG. 6 is a flow chart illustrating the architecture of software for operating the present Class B/ORBCOMM radio and also illustrating operation of the radio.
Figure 7:
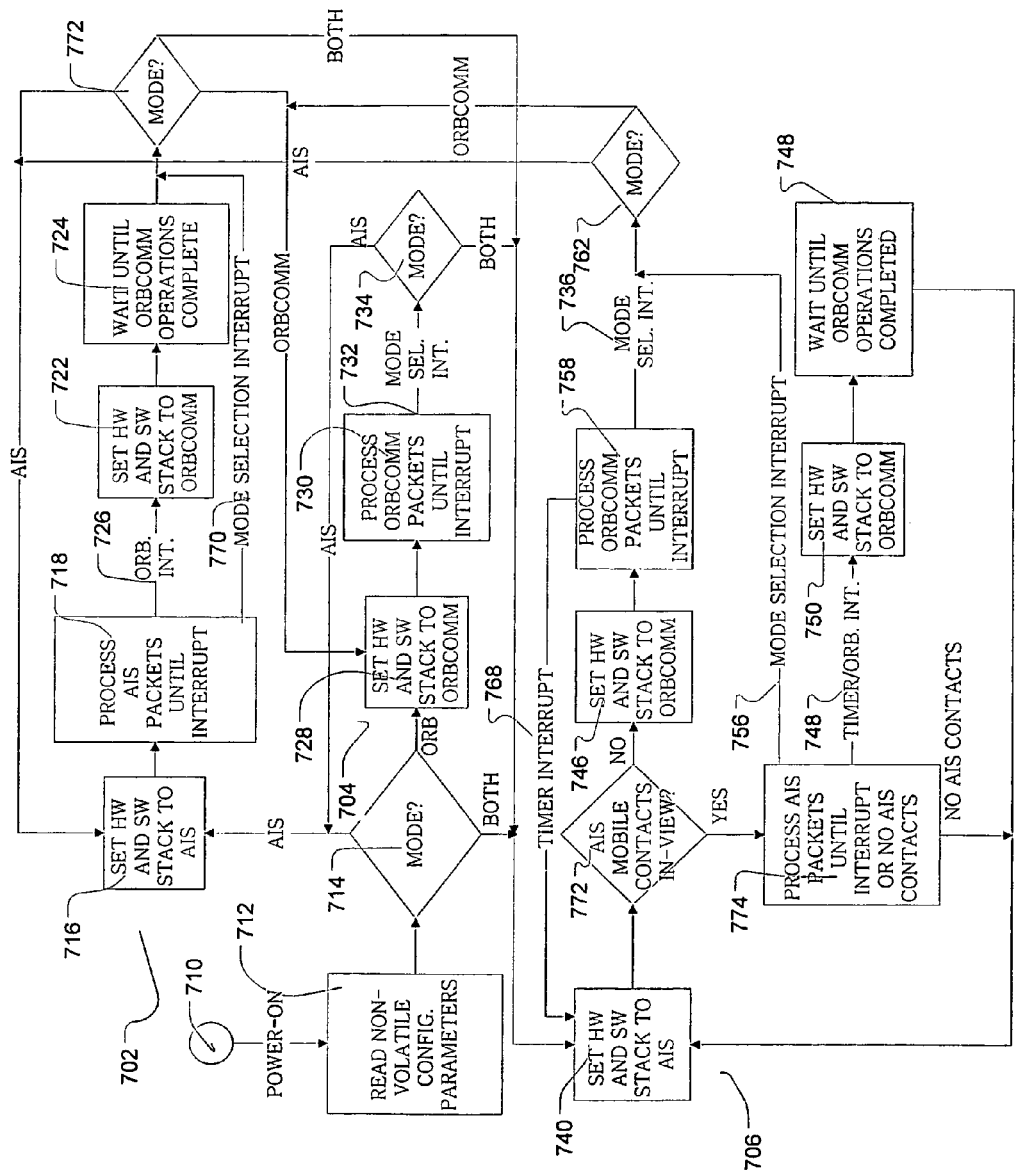
FIG. 7 is a flow chart illustrating the architecture of software for operating the present AIS RX only/ORBCOMM radio and also illustrating operation of the radio.

FIG. 6 is a flow chart illustrating the architecture of software for operating the present Class B/ORBCOMM radio and also illustrating operation of the radio. In FIGS. 6 and 7, operational blocks are either explicitly referred to by reference numeral as blocks within the description or simply have the reference numeral following after a descriptive clause. Operations need not take place in the order described unless logically required. Hardware components described below are illustrated in FIG. 5.

Operation begins at block 610 with power on. Configuration parameters are read, 612. The radio is tuned to first and second AIS frequencies, 614. Receiving, transmitting and packet processing is performed in accordance with AIS class B requirements, 616.

Also, operation proceeds to block 620 where the system determines if it is time to tune to DSC in accordance with Class B requirements. A type signal may be provided by the timer 530 (FIG. 5). If so, the software stack is set to the DSC mode, 622. The first synthesizer 442 tunes to DSC channel 70, 624. DSC received packets are processed, 626. This process occurs until there is a timer interrupt 628, at which point the radio is configured for ORBCOMM operations. Operations will continue in ORBCOMM mode as packets are processed and received and transmitted in accordance with the ORBCOMM protocol 632. This continues until a timer interrupt is received 634 to return the radio to DSC operation, 622.

FIG. 7 is a flow chart illustrating the architecture of software for operating the present AIS RX only/ORBCOMM radio 300 and also illustrating operation of the radio. The software architecture of FIG. 7 defines interconnections in a processor. The software architecture also defines the program for operation on a digital processor. In the following description, where a reference to both follows a sentence, it refers to the operating block at which the recited operation is illustrated. FIG. 7 may be viewed as having an AIS operating routine 702, an ORBCOMM operating routine 704, and a multimode operating routine 706. These designations are simply for convenience in description. They are not intended to be rigorous descriptions, and do not limit the present subject matter. Hardware components referred to are illustrated in FIG. 4. Interrupts discussed below may be provided as described with respect to FIG. 4.

Operation is initiated at terminal 710 with power being turned on. The non-volatile configuration parameters are read in a digital processing unit, 712 (e.g., processor 300). The processor 300 determines whether the radio has been configured for AIS, ORBCOMM, or multimode, 714. In the AIS mode, the hardware is configured for AIS and AIS software stack 314 is selected, 716. In absence of an ORBCOMM interrupt 726 or a manual mode selection interrupt 770 the processor 300 operates in accordance with the AIS stack, 718. Alternatively, an ORBCOMM interrupt may be provided, 726. In this situation, the hardware is configured for ORBCOMM and software 312 is selected, 722, and the processor 300 will operate in accordance with the ORBCOMM stack until finished with the ORBCOMM command, 724. A manual modem selection interrupt 770 can also remove the radio from AIS only operation, 718. When this occurs, the processor 300 determines which operating mode has been selected, 772. When AIS is selected, the processor 300 returns again to configure the radio for AIS operation, 716.

If the mode sensor senses an ORBCOMM signal, and the ORBCOMM detection has been made at 714 or 772, the software stack 312 is selected, 728. ORBCOMM processing continues, 730, until a mode selection interrupt is provided, 732. The selected mode is determined, 734. When AIS mode has been commanded, operation is routed to block 716. Otherwise, operation is routed to block 740 where the combined ORBCOMM and AIS multimode operations commence. In this configuration, the processor prepares the radio for combined network operations by first configuring the radio for AIS operations, 740. A range sensor determines if AIS mobile contacts are "in-view," 772. If so, the signal is provided to receive and process AIS packets, 774. The radio continues to run in the AIS configuration, 774, as long as a determination is made that AIS mobile contacts are in-view, 772. If an ORBCOMM or timer interrupt is provided, 748, then the radio is set to the ORBCOMM configuration 750 and remains in the ORBCOMM configuration until ORBCOMM operations are completed, and then operation returns to the AIS configuration, 740. If a mode selection interrupt 756 is provided while in AIS configuration, 774, the mode is determined, 762, and the radio is routed to the applicable mode, 716 or 728.

If AIS contacts are not in-view while in multimode, 772, then the radio is configured for ORBCOMM, 746, and processing occurs until an interrupt is provided, 758. If a mode selection interrupt 736 occurs while processing ORBCOMM packets 758, then the mode is determined, 762, and the processing is routed to the applicable mode, 716 or 728. If a timer interrupt 768 occurs while processing ORBCOMM packets 758, then the radio is reconfigured to AIS, 740, in order to check if AIS contacts have moved into range 772.

Commands may also be introduced, as from the user interface 208 while in any of the operating modes, 702, 704, 706. ORBCOMM packets may be processed and sent or received per the ORBCOMM serial interface specifications via the user interface. Mode selection interrupts can also be generated via the user interface, and ORBCOMM and mode selection interrupts can also be generated through manual switches on the radio.

AIS transmissions and DSC reception (Class B) signals require a minimum duty cycle in order to comply with safety requirements. In the present system, ORBCOMM operations can be suspended in accordance with ORBCOMM regulations in order to permit AIS transmissions and DSC reception. The system stores ORBCOMM data, and processing resumes when the AIS transmission is completed.

Thus, the scope of the embodiment should be determined by the appended claims and their legal equivalents, rather than by the examples given.

What is claimed is:

1. A software defined radio comprising: a front end with a first radio frequency receiving signal path and a second radio frequency receiving signal path, a conversion section for converting radio frequency signals to and from digital baseband, and a digital processor, said processor having a first software stack configured to process a signal in a first protocol and a second software stack configured to process a signal in a second protocol having tuners, a control signal source controlled by said processor to connect said radio selectively to one said receiving signal path, and a switching circuit to selectively connect the radio as a transceiver operating in the first protocol in one mode, and to connect the radio as a transceiver operating in the second protocol in a second mode.

2. The software defined radio according to claim 1 wherein said first software stack is configured to process AIS signals.

3. The software defined radio according to claim 2 wherein said second software stack is configured to process ORBCOMM signals.

4. The software defined radio according to claim 3 wherein said processor comprises an input for communicating with a user terminal.

5. The software defined radio according to claim 4 wherein said processor includes an interface for connecting said processor to a data bus.

6. A software defined radio comprising: a front end with a first radio frequency receiving signal path and a second radio frequency receiving signal path, a conversion section for converting radio frequency signals to and from digital baseband, and a digital processor, said processor having a first stack configured to process a signal in a first protocol and a second stack configured to process a signal in a second protocol having tuners, and a control signal source controlled by said processor to connect said radio selectively to one said receiving signal path, wherein said first stack is configured to process AIS signals, wherein said second stack is configured to process ORBCOMM signals, and wherein said processor includes an interface responsive to an override signal for switching from one of said AIS and ORBCOMM protocols to the other.

7. The software defined radio according to claim 6 wherein said processor includes a device for assuring a minimum duty cycle in the AIS mode.

8. A software defined radio comprising: a front end with a first radio frequency receiving signal path and a second radio frequency receiving signal path, a conversion section for converting radio frequency signals to and from digital baseband, and a digital processor, said processor having a first stack configured to process a signal in a first protocol and a second stack configured to process a signal in a second protocol having tuners, and a control signal source controlled by said processor to connect said radio selectively to one said receiving signal path, wherein said front end further comprises a first radio frequency transmitting signal path and a second radio frequency transmitting signal path, and wherein said control signal source is coupled to selectively connect said radio through one said transmitting signal path.

9. The software defined radio according to claim 8 wherein said first stack is configured to process AIS signals.

10. The software defined radio according to claim 9 wherein said first stack is configured to process ORBCOMM signals.

* * * * *